Kingston Goddard.
Ice Pitcher, Etc.
4318 REISSUED APR 4 1871
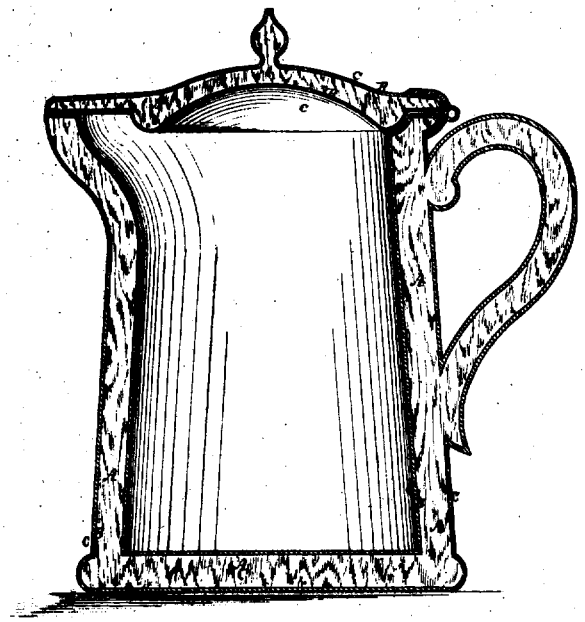
Witnesses.
David Heaton
Roger W. Potter 2nd
Inventor.
Kingston Goddard
By T. A. Burnett.
Attorney.
THE NORRIS PETERS CO., WASHINGTON, D. C.

United States Patent Office.

KINGSTON GODDARD OF RICHMOND, NEW YORK, ASSIGNOR TO HIMSELF AND JOHN P. ADAMS.

Letters Patent No. 97,390, dated November 30, 1869; reissue No. 4,318, dated April 4, 1871

IMPROVEMENT IN WATER-PITCHERS AND OTHER VESSELS.

The Schedule referred to in these Letters Patent and making part of the same.

*To all whom it may concern:*

Be it known that I, KINGSTON GODDARD, of Richmond, in the county of Richmond and State of New York, have invented a new and useful Improvement in Ice-Pitchers and other vessels; and I do hereby declare that the following is a full, clear, and exact description thereof, which will enable others skilled in the art to make and use the same, reference being had to the accompanying drawing forming part of this specification, in which the figure shows a vertical section of my improved ice-pitcher.

My said invention relates to making ice-pitchers and other vessels that are usually made of metal by combining a body of wood or other suitable non-conducting material with a covering of metal by electro-plating or other means; the object being to produce a durable, light, and inexpensive non-conducting vessel, having all the durability and appearance of the solid metal at a comparatively trifling cost.

In the drawing—

A is the body of non-conducting material, which may be of wood, *papier mache*, &c.; and B C is the metallic covering incasing the entire body, the lid, spout, and handle being made in the same manner, or the latter made entirely of metal, if required, to afford the adequate strength.

After the body A is turned or fashioned of the material in the desired form, it is covered with metal by first thoroughly coating the body with plumbago, or other suitable substance, for depositing the after-metal coating upon. It is then placed in the plating-bath and at first coated with copper or other cheaper metal, B, after which and suitable preparation, if required, the copper may be coated with silver C, thereby completely incasing the non-conducting body A in a silver-plated covering, B C, and adapting the vessel for an ice-pitcher or water-cooler, both by its refrigerative properties and substantial construction and beautiful external appearance.

In some instances, where the form of the body will admit of it, the metallic covering may be applied to the body by the operation of "spinning" sheet metal upon the form or otherwise; or a part of the covering may be supplied by spinning, and a part by electro-plating, and the whole finally coated, to give the finish, by silver-plating, according to the form of the article or the nature of the circumstances of its manufacture.

The electro-plating and spinning herein mentioned are the ordinary processes, and are not claimed.

I claim as my invention—

The improved ice-pitcher or other vessel, composed of a body of wood or other suitable non-conducting material plated or covered with metal, substantially as described, as a new manufacture.

KINGSTON GODDARD.

Witnesses:

JAMES E. CHANDLER.
JOHN G. H. MEYERS.